Jan. 28, 1936.  W. G. DOYLE  2,029,096
HYDRAULIC BRAKE
Filed Dec. 1, 1931  4 Sheets-Sheet 2

Fig.2

INVENTOR
Willis G. Doyle
BY F. H. Gibbs
ATTORNEY

Patented Jan. 28, 1936

2,029,096

UNITED STATES PATENT OFFICE 2,029,096

HYDRAULIC BRAKE

Willis G. Doyle, Detroit, Mich., assignor to American Car and Foundry Motors Company, New York, N. Y., a corporation of Delaware Application December 1, 1931, Serial No. 578,321

42 Claims. (Cl. 188—152)

This invention relates to hydraulic brakes and has for one of its objects to provide an extremely reliable hydraulic brake in which the operation is carried out in stages, one of which effects the setting of the brake shoes or bands to pressure contact with the drums and the other of which provides for the application of liquid under high pressure to effectively brake the wheels.

The invention has for another object to provide a simple and compact hydraulic power unit adapted to be driven from an internal combustion engine or other motor and also adapted to be attachable quickly and conveniently to the chassis of a vehicle in the space ordinarily available under present day construction.

Another object of the invention is to provide a hydraulic system of braking which shall be under the control of the usual brake pedal or some manually operable part, the hydraulic means and mechanical actuating devices therefor being so related that the operator is able to feel the progressive application of the braking effort whereby the action of mechanical foot brakes or hand brakes is simulated to a certain extent.

Another object lies in the provision of a safe and reliable high pressure hydraulic braking apparatus having means compensating for any possible leaks which might occur allowing the application of the fluid under pressure to the wheel system when not intended.

Still another object is to provide an exceptionally compact hydraulic power system having a substantial storage capacity for liquid under high pressure and to so restrict the outlet of liquid from the pressure reservoir in single braking operations that a high number of these operations may be accomplished after the engine or other driving motor has been stopped.

An important feature of the invention involves the provision of a high pressure builder and storage cylinder for oil, suitably combined with a device for primarily setting the brake shoes against their respective drums by hydraulic low pressure means, and the controlling of the outlets from the high pressure builder to the wheel system by the completed actuation of the low pressure shoe setting means. Preferably the device for effecting this sequence of operation comprises a mechanical leverage system actuated by the brake pedal and staged so as to primarily actuate a piston, forcing oil into the wheel system and upon definite resistance to the action of the piston to operate secondarily other parts of the leverage system which progressively open a valve between the high pressure system and the wheel system.

It is also a feature of the invention in its preferred form that the brake releasing operation is stage to first cut off the high pressure oil supply and subsequently release the brake shoes by returning the low pressure piston to its normal position.

The invention accordingly consists in the various features of construction, combinations of elements and arrangement of parts which will be exemplified by the construction hereinafter set forth and shown in the accompanying drawings and the scope of the application of which will be indicated in the appended claims.

*General arrangement of parts*

An oil reservoir and devices for storing the oil under high pressure and delivering it to the wheel system are included in a unit 20 attached to the vehicle chassis adjacent a brake pedal 21 and in position allowing for a chain and sprocket or belt connection 21' with some engine-driven part. Each wheel is provided with a brake drum 22 and cooperating brake shoes 23, the latter being radially movable outward by the delivery of oil from the unit 20 through suitable piping 24, 24' to the fluid motors 152. The shoes are normally held radially inward from the drums by springs 25.

The unit housing and body

Figure 2:
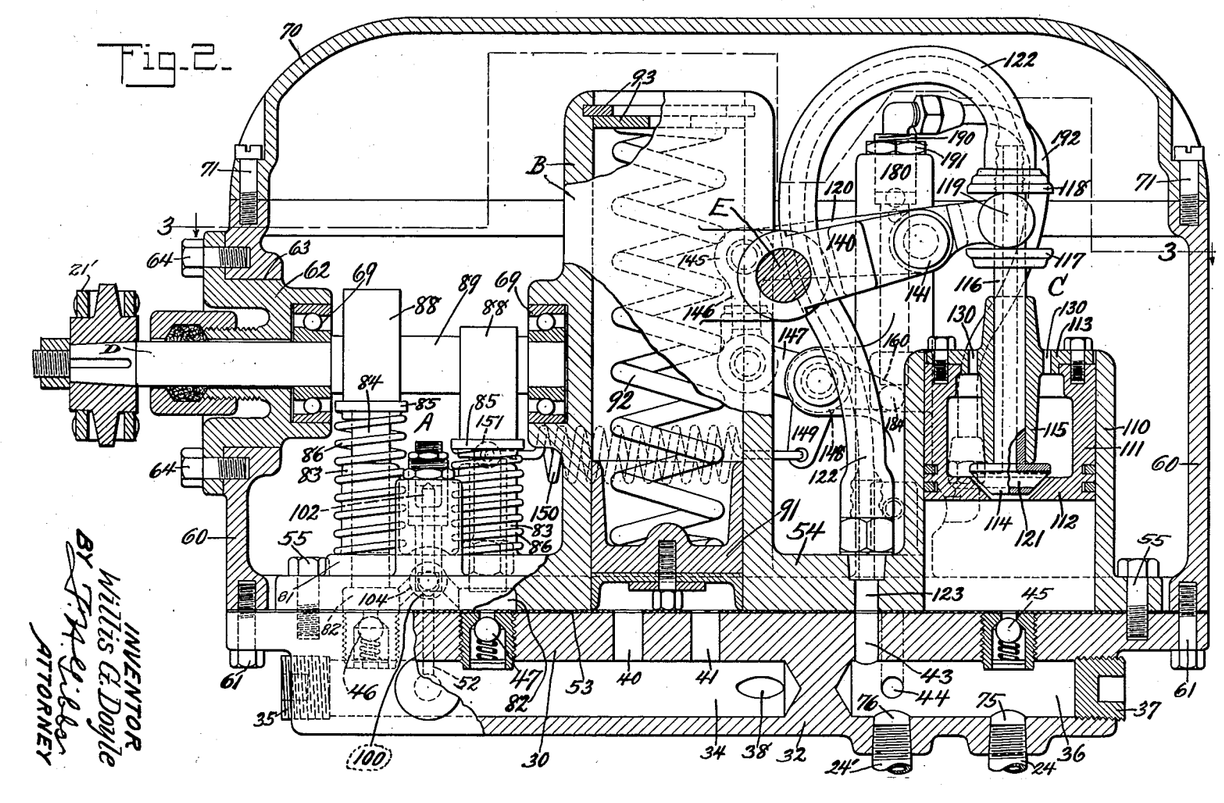
Fig. 2 is a view in longitudinal section, with fragments in said elevation, of the engine-driven unit employed for hydraulically actuating the brakes.
Figures 6, 8, 9, 10, 11:
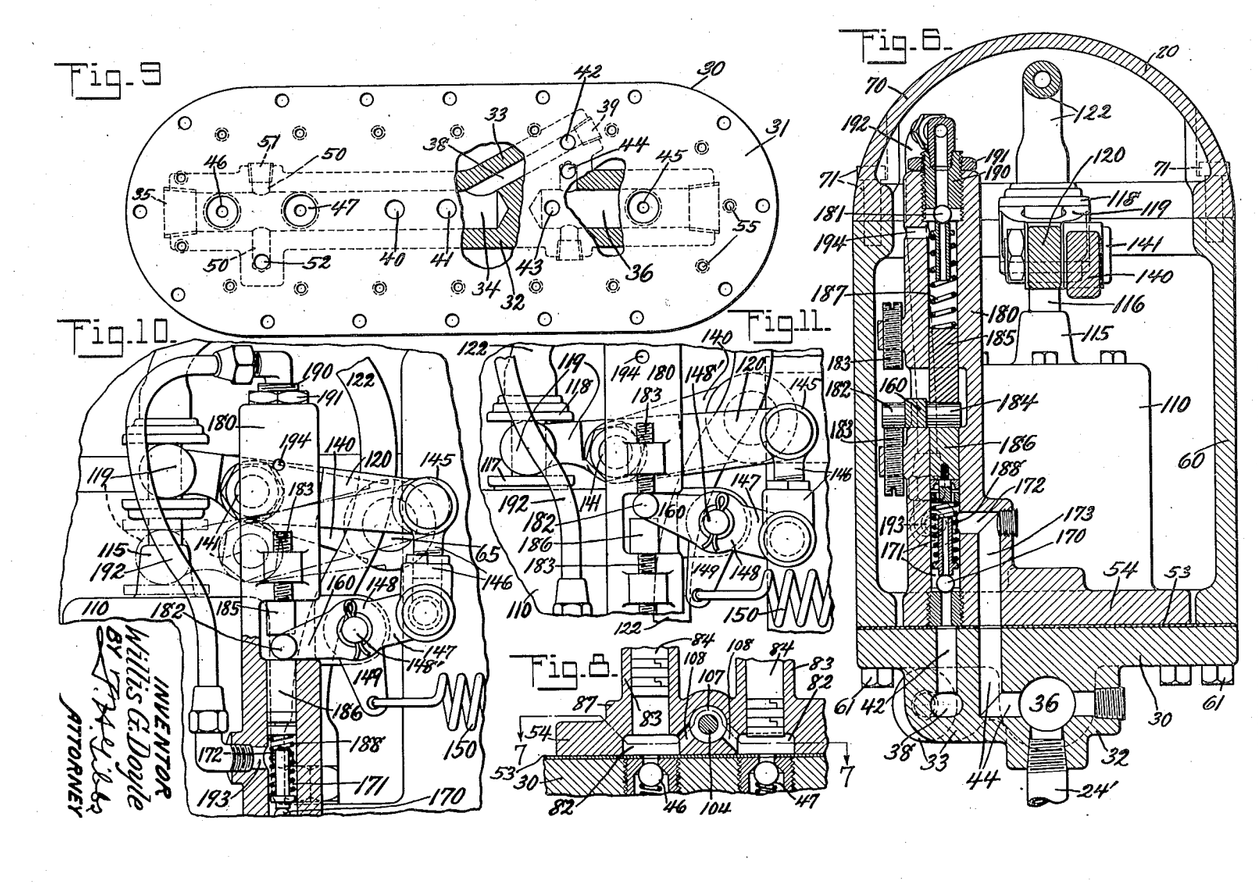
Fig. 6 is a view in vertical cross section taken on the line 6—6 of Fig. 3.
Fig. 9 is a top plan view of the unit base portion broken away to show more clearly the interior construction.
Figs. 10 and 11 are fragmentary views showing the means for actuating the high pressure release valve.

As best shown in Figs. 2, 6 and 9 a unit base 30, having a substantially plane upper surface 31, is formed preferably of cast metal having an under centrally-disposed longitudinal rib 32 with a lateral offset 33. The rib is drilled inwardly from one end to provide an oil passage 34, the outer end being closed at 35. From the opposite end the rib 32 is drilled inwardly to provide an oil passage 36 and the outer end is closed as indicated at 37. The lateral offset 33 is drilled inwardly to provide an oil passage 38 communicating with oil passage 34 and the outer end of the lateral offset passage is closed as shown at 39. From the upper surface of the base downward, two oil passages 40 and 41 are drilled to communicate with the passage 34. The passage 38 of the offset lateral portion 33 is open to the top surface of the base by a vertical drilled passage 42. A passage 43 opens the bore 36 to the upper surface of the base. A passage 44 opens the passage 36 at another point to the top surface 31 of the base. An outlet valve 45 of spring pressed ball type is fitted between the top surface 31 and passage 36 and two pump outlet valves 46 and 47, also ball type, are fitted in the base communicating with the passage 34. The ribbed portion 32 of the base is transversely drilled at 50 through the passage 34, has its outer end closed at 51 and its inner end connecting with a restricted orifice 52 extending to the upper surface of the base member.

Over the top surface of the base member a suitable gasket 53 is positioned. The gasket has apertures corresponding to all those previously described and two series of bolt holes for the reception of outer marginal attaching bolts.

Over the gasket a cylinder block casting or body 54 is positioned and attached to the base by a series of bolts 55. This body comprises the cylinders for a pump A, a storage cylinder B, a cylinder for the low pressure actuator C, suitable mountings for the engine-driven part D, the brake pedal rock shaft E, and various other controlling valves and levers more fully described hereinafter.

Generally speaking, the body 54 provides a unitary support and attaching means for all the operative parts of the hydraulic actuator, and permits of an assembly and attachment of same to the base as a unit to be completed only by the addition of the engine-driven cam shaft D and the rock shaft E which exteriorly connects with the brake pedal.

Figures 3, 4, 5, 7:
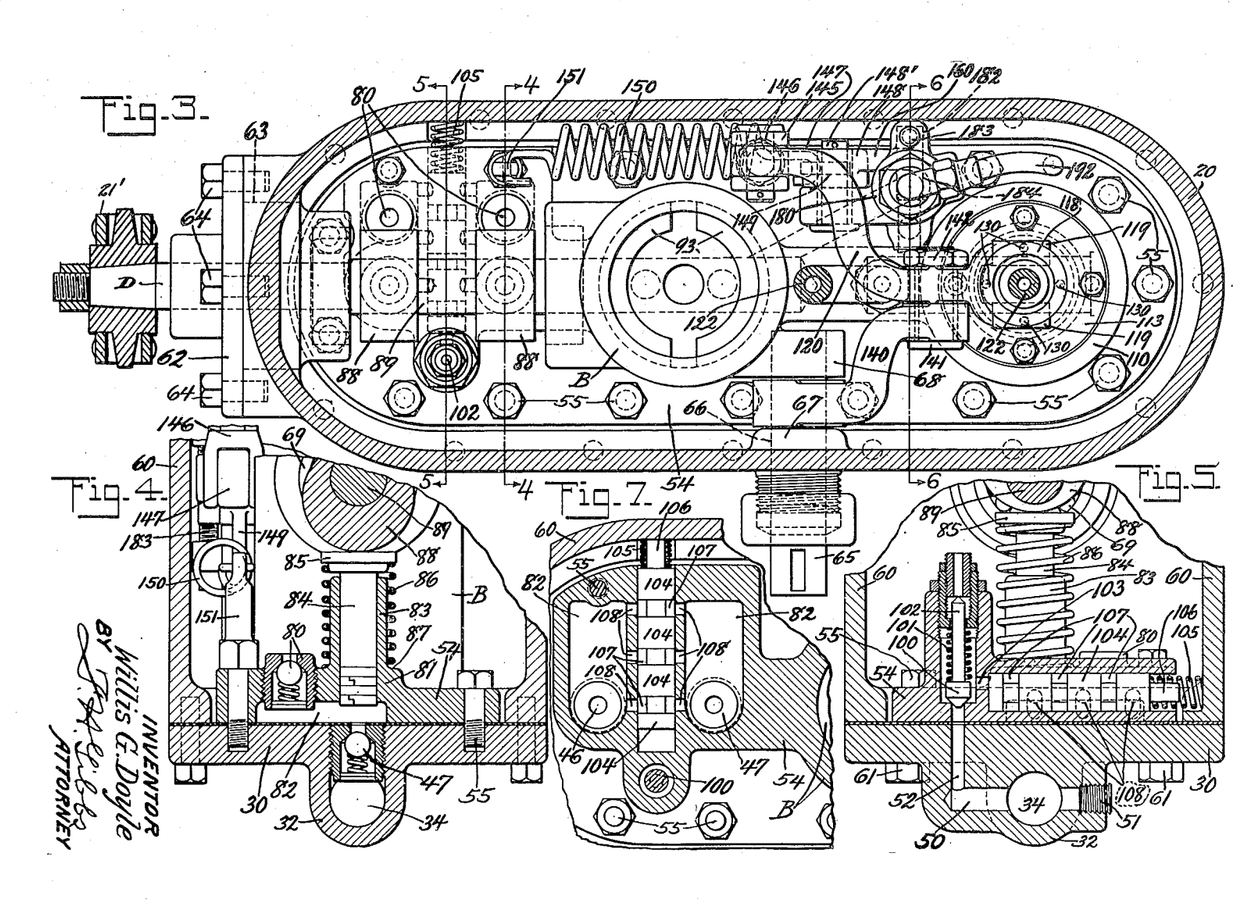
Fig. 3 is a view in horizontal cross section taken substantially along the line 3—3 of Fig. 2.
Fig. 4 is a fragmentary view in vertical cross section taken on the line 4—4 of Fig. 3.
Fig. 5 is a fragmentary view in vertical cross section taken on the line 5—5 of Fig. 3.
Figs. 7 and 8 are views of the two cylinder pump and controls therefor, Fig. 7 being a sectional view taken on the line 7—7 of Fig. 8.

After the body unit 54 has been assembled in position on the base a continuous side wall housing 60 is arranged around the unit and is secured to the base by the marginal bolts 61. To complete the actuating mechanism the engine-driven cam shaft D surrounded by suitable journal devices 62 is introduced at the end of the housing 60 through an opening 63 for the purpose and bolted in position as indicated at 64. As shown in Fig. 3, a rock shaft 65 is introduced through opening 66 in the side of the housing and located for rotative movement in a boss 67 projecting inwardly from the side of the housing and a lug 68 which is a cast extension of the body 54. The housing is then filled with oil to a suitable level and a housing cover 70 is secured to the top edge of the housing as indicated in Fig. 2 at 71. Ports 75 and 76 in the lower part of the base rib 32 connect the passage 36 with the rest of the wheel system through the conduit 24 and another conduit 24' leading respectively to the rear and front wheels of the vehicle.

The high pressure builder and storage device

As shown in Figs. 2, 4 and 8, a two-cylinder oil pump is provided with a pair of inlet valves 80 arranged in a platform 81 of the body casting 54 and communicating with cored out passages 82 which, in turn, communicate with cylinders 83 of the pump. These cylinders are preferably formed as a part of the body casting and each is equipped with a piston or plunger 84 having upper flanged portions 85 against which springs 86 bear and react on bosses 87 of the casting 54. The springs tend to hold the plungers in elevated position but the latter are periodically depressed by 180° spaced cams 88 on engine-driven shaft 89 mounted in suitable ball bearings 69 in the body block 54 and in the end wall 60. Pump outlet valves 46 and 47 admit the oil from the pump into the passage 34 of the base. This passage is in what may be termed the pressure builder end of the unit. The oil so introduced to passage 34 passes upwardly through the openings 40 and 41 in the base member and the pump pressure is transmitted to a piston 91 arranged in storage cylinder B and normally held against the base 30 by a relatively heavy coiled spring 92 bearing against the top of the piston head and reacting against rings 93 arranged in the top of the cylinder B. This spring is assembled with an initial tension of approximately 1000 pounds and has a ratio of approximately 600 pounds to an inch of compression, according to a preferred form of the invention. Continuous operation of the pump takes oil steadily from the housing reservoir and discharges it through the passage 34, openings 40 and 41, until the piston 91 is substantially elevated compressing the spring 92 and storing up oil in the space provided by the displacement of the piston in the cylinder. At this time the oil has no outlet to the passage 36 or any part of the wheel system due to suitable valves and controls which will later be described. Upon the building of suitable oil storage and pressure a back pressure develops in the passage 34, which is transmitted through the passage 50 to the restricted orifice 52. This is predetermined to lift a valve 100 from its seat in the body casting (see Fig. 5) against the action of spring 101, closing an upper valve 102 and admitting oil through an opening 103 to press against a grooved plunger 104 urging it to compress a spring 105 until an end 106 of the plunger is stopped by contact with the side wall of housing 60. As more clearly shown in Fig. 7, the movement of the plunger 104 causes the grooves 107 thereof to register with recesses 108 in the body casting thereby establishing a continuous passage between the cored out portions 82 in the platform of the base and allowing free passage of oil from one cylinder of the pump to the other. By this means continued operation of the pump merely passes the oil from one cylinder to the other and back again without increasing the pressure in the passage 34 or adding to the amount of oil in storage. When this pressure falls for any reason, the spring 101 returns valve 100 to its seat and opens the upper valve 102. This relieves the pressure on the end of the plunger 104 allowing spring 105 to return the plunger discontinuing the registration of the grooves and ports. Liquid displaced by the plunger in returning is exhausted through opening 103 and around upper valve 102. The pump is thus restored to effective operation discharging liquid to the storage cylinder.

The primary actuator or shoe setting means

For setting the brake shoes against the drums of the respective wheels as an early stage of the operation of the device the low pressure actuator C is provided comprising a cylinder 110 preferably a part of the body casting 54. A piston 111 has a head 112 and a skirt 113. The head is constructed in part with an inverted poppet valve 114 slidable in a sleeve 115 extending from the skirt 113. The valve 114 has a hollow stem 116 slidable in the sleeve and provided with spaced fixed collars 117 and 118 engaged by the yoke end 119 of a lever 120. The passage in the valve stem 116 communicates with a transverse passage 121 in the valve head. The upper end of the hollow valve stem is joined to a flexible pipe 122, the lower end of which is secured to the body 54 in communication with an orifice 123 therein which, in turn, communicates with the passage 43 delivering into the wheel system chamber of passage 36. Normally the piston 111 is held elevated in the cylinder 110 by lever 120 as will be fully apparent hereinafter, and the valve maintains the open position shown clearly in Fig. 2 of the drawings. The skirt 113 is apertured at 130 allowing for the free flow of oil in either direction between the reservoir and the upper part of the cylinder.

Figures 1, 12, 13, 14:
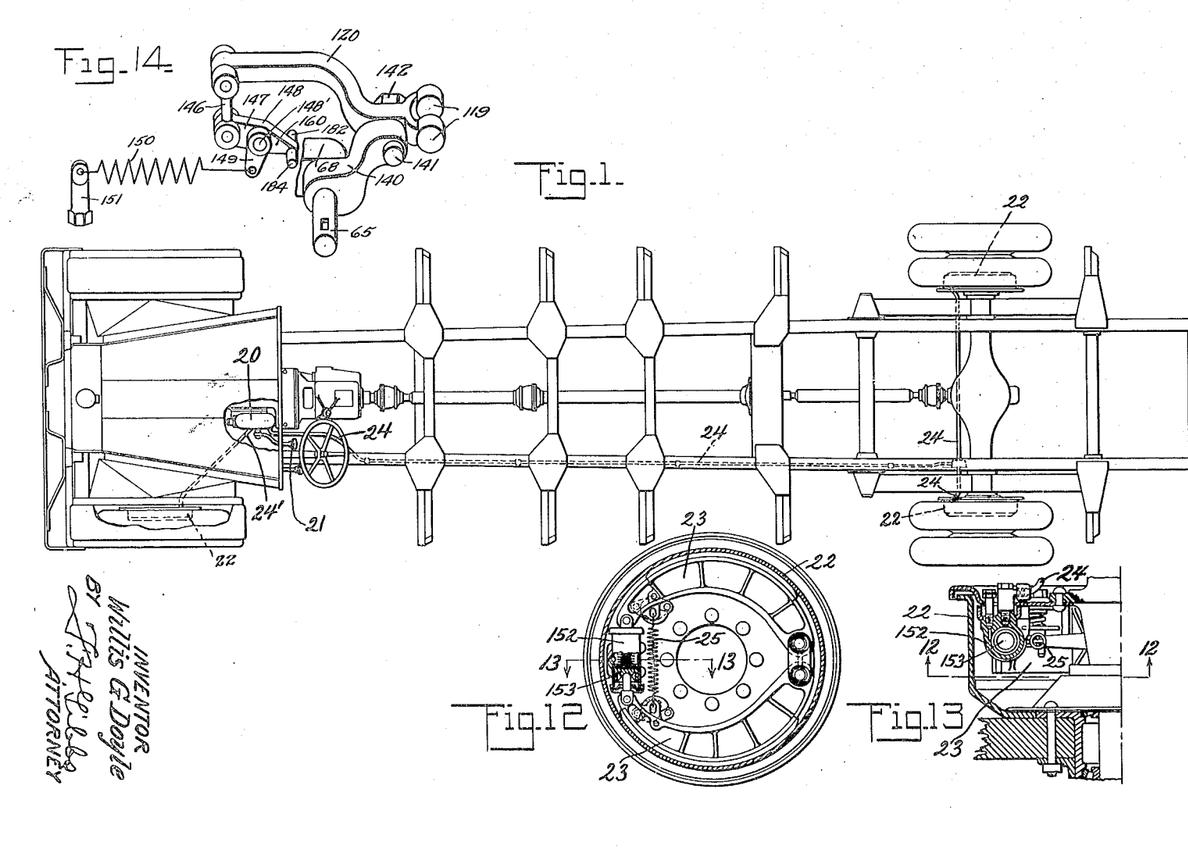
Figure 1 is a plan view of an automobile chassis showing the arrangement of the improved hydraulic braking system as applied to the wheels of an auto truck.
Fig. 12 is a view of one of the several brake drums showing the hydraulic connections to the brake shoes. (See section 12—12 of Fig. 13.)
Fig. 13 is a view in section taken on the line 13—13 of Fig. 12.
Fig. 14 is a detail view, in perspective, showing certain lever arrangements forming a part of the present invention.

To carry out this low pressure stage of the operation the brake pedal is given an initial movement rocking the shaft E clockwise, as viewed in Figs. 2 and 3, and correspondingly rocking an arm 140 having one end fixed on the shaft and the other end secured to the side of the yoke lever 120 by a shoulder stud 141 and nut 142. The stud connection causes both arms to be moved downwardly upon an initial movement of the brake pedal and allows for relative rotative movement of the associated arms. The lever 120 has one end yoked at 119 to straddle the valve stem 116 between the collars 117 and 118 as previously described. The other end of the lever is pivotally arranged in a yoke 145 of a link 146 (see Figs. 10 and 14). The link 146 has its lower end pivoted to an arm 147 of a bell crank lever 148, another arm 149 of which is held by a substantially heavy tensile spring 150 to a fixed standard 151 secured in the body 54 (see Fig. 3). The strength of the spring 150 is determined to be sufficient to prevent movement of the bell crank lever 148 during the initial movement of the brake pedal and related rocking of the arm 140 and is sufficient to normally maintain lever 120 in the position shown in Fig. 2 where the yoke 119 serves to hold piston 111 in elevated position. By reason of this construction the yoke lever 120 is carried downwardly under the initial movement of the brake pedal, pivoting about the upper end of link 146 substantially as though this link were fixed or unyielding. As a result of this the valve stem 116 is carried downwardly closing the valve in the head of the piston and by continued operation the piston is moved downwardly in the cylinder 110 forcing the liquid through the valve 45 into the chamber 36 in the wheel brake system. The liquid is displaced through the ports 75 and 76 and through the conduits 24 and 24' to wheel cylinders 152 where it acts upon opposite end pistons 153 loosely connected to the brake shoes 23 within the respective wheel drums. This sets the shoes against the drums and each shoe is assured of contact with its cylinder drum before the high pressure system is permitted to operate. From the following description it will be seen that the resistance offered to the downward movement of the low pressure piston governs the opening of the valve between the high pressure end of the unit and the wheel brake system end.

The high pressure actuator means

When the low pressure actuator piston has caused the last brake shoe to be set against its respective drum substantial resistance is offered to further downward movement of the piston. Thereupon, as the brake pedal is continued in its movement, the yoke end 119 of the lever 120 between the collars 117 and 118 on the valve stem 116 becomes the point about which the arm 120 rocks. The collar 117 serves as the fulcrum. The downward pressure is applied at stud 141 and the link end of the arm is moved downwardly carrying the link 146 and rotating the bell crank lever 148, pivoted at 148', against the opposition of spring 150. This lifts a short arm 160 of lever 148 reference being had now more particularly to Figs. 6, 10, 11 and 14 of the drawings. A high pressure release valve which normally closes the high pressure system from the wheel system is shown in Fig. 6 at 170. The lateral offset 33 of base rib 32 has an oil passage 38 opening at one end into the high pressure conduit 34 and having at its other end a vertical orifice 42 extending to the top surface of the base. In the body block 54 opposite this orifice the valve 170 is located in a passage 171 communicating with a cross passage 172 and a vertical passage 173 to further communication with conduit 44 in the base which delivers into the wheel system chamber 36. The body block at this region is constructed with an upstanding tube 180 having the lower valve 170 just described and an upper valve 181 which acts as a release valve working in opposition to lower valve 170. The arm 160 of the bell crank lever has a lateral extension 182 operating between suitable adjustable stops 183, and an opposite lateral extension 184 operating between upper and lower pins or plungers 185 and 186 respectively. The vertical position of the plungers 185 and 186 governs the pressures on upper and lower high pressure release valves 181 and 170 through the agencies of upper valve spring 187 and lower valve spring 188. The movement of the bell crank lever 148 as aforesaid, relieves the pressure on the spring 188 of the high pressure release valve 170 allowing the delivery of oil under high pressure from the storage cylinder B through the valve 170 into the passages 171, 172, 173 and 44, progressively increasing the quantity and pressure as the valve is continued in its opening movement under control of the brake pedal. The liquid under high pressure is transmitted through the wheel system to the brake shoe pistons effectively braking the relative rotary movement between the wheel drums and shoes. During this operation the low pressure actuator piston 111 is of course maintained in its lowered and active position with valve 114 closed. When the high pressure liquid is admitted to the wheel system check valve 45 prevents the transmission of the high pressure to the low pressure actuator.

*The releasing means*

As the brake pedal is allowed to return under the influence of the usual spring the mechanical link and leverage system reverses in its sequence of operation. Link 146 rising, allows heavy spring 150 to restore the bell crank lever 148 to normal position thereby closing high pressure release valve 170 which lowers the pressure to the amount exerted by the low pressure actuator C. Continued release of the brake pedal lifts the rocker arm 140 and the yoke lever 120, the latter now again pivoting in the yoke 145 of the link 146. This lifts the valve stem 116 opening the valve 114 causing the valve head to pick up the sleeve 115 of the piston and lift the piston to its original position in the cylinder. The wheel system is now restored to normal condition hydraulically, the displaced liquid by-passing the valve 45 through passages 43 and 123, the flexible hose 122 and hollow valve stem 116 to the open valve 114, and the springs 25 reset the brake shoes in spaced relation with the drums.

The use of the liquid from the storage cylinder causes a drop in pressure in the high pressure end of the system allowing spring 105 to move plunger 104 thereby reestablishing the effective operation of the pump.

*The upper high pressure valve and relief features*

The upstanding tube 180 is recessed about midway of its length to receive the lever arm 160 and projecting pin 184. The plungers 185 and 186 play in this recess as the lever arm is moved with its pin 182 between the adjustable stops 183 threaded in lugs on the tube at opposite sides of the recess. These stops limit the arm movement and according govern the compression and expansion of the springs of upper and lower valves 181 and 170 in the high pressure system. At the top of the tube 180 a threaded sleeve 190 is inserted and adjustably held in position by a nut 191. A copper tube 192 connects a port 193 near the lower valve in passage 171 with the adjustable sleeve 190 by a suitable elbow nipple and connector. This places both the valves between the high and low pressure systems. It will be noted that the bell crank lever 148, when actuated, causes compression of the upper valve spring in proportion to the release of pressure on the lower valve spring. This effectively maintains the upper valve closed when the lower valve is opened, unless such back pressure should be developed as to overcome the increased spring compression. When this occurs the oil is exhausted through passage 194 in the side of the tube. Should there be leakage at the lower valve of the high pressure system when poppet valve 114 is closed, the upper valve will allow exhaust through passage 194. The spring size and adjustment of the upper valve is, however, sufficient to hold it closed during the normal operation of the low pressure actuator. The pressure developed by the latter in a preferred form of the invention, is about 25 to 30 pounds per square inch.

The valve 114 of the low pressure actuator, when opened by continued release of the brake pedal, releases the balance of the wheel system pressure, and the liquid displaced by the down stroke of piston 111 is returned through the hose 122, valve stem 116 and valve 114, to the cylinder 110.

It will be seen, therefore, that the apparatus is protected against undue pressures and the dangers or annoyances accompanying accidental or unintended escape of the fluid from the high pressure end of the device.

It will be noted furthermore that an extremely compact apparatus is provided which first sets out all the brake shoes physically and then applies the desired amount of pressure from the storage cylinder to obtain the desired stop.

The operation of the system herein described has been specifically set forth heretofore in the specification and it is therefore believed apparent to those skilled in the art without specific repetition. Those skilled in the art will recognize that the present invention provides a low pressure system or actuator for setting the brake shoes and a high pressure system which is operative when the shoes have been set to apply braking force; the low and high pressure systems being, in effect, interconnected for sequential operation upon actuation of the usual brake pedal, and the high pressure system including a means to build up and maintain fluid in a storage compartment under a predetermined high pressure so as to be available at all times for the purpose of applying brakes.

The low pressure system includes a piston 111 operative to force fluid through piping 24 and 24' upon actuation of the shaft E by the brake pedal to cause initial actuation or setting of the brake shoes; continuation of actuation of shaft E effecting, through yoke lever 120, link 146 and bell crank 147, operation of a valve 170 (see Figs. 6 and 10) which normally isolates the high pressure system from the wheel brake system, to permit the effective operation of the high pressure system to apply braking force to the brakes, operation of lever 147 permitting release of valve 170 from its closed relation with passage 42 and permitting passage of air under high pressure from the chamber 34 through port 38 to passages 42 and 44 to chamber 36 and thence to piping 24 and 24'. The present invention includes a low pressure system or actuator adapted, upon operation of a brake pedal, to pass fluid under relatively low pressure whereby said fluid initially sets the brakes. The valve 170 is interposed between the high pressure system and the receiving chamber for the fluid from the low pressure system. The valve 170 is adapted to be unseated by the liquid under high pressure but is normally retained in seated position by suitable means connected to the low pressure system. The operation of the brake pedal causes, sequentially, an initial setting of the brake shoes and then an unseating of the valve 170 to permit the high pressure system to pass fluid under high pressure to the fluid receiving chamber of the low pressure system whereby braking force is applied to the wheel brake system to actuate the brake shoes into braking engagement with the brake drums.

The present invention also provides for the continuous maintenance of a supply of fluid under high pressure in the storage chamber B due to the pump comprising the pistons 84 operating in the cylinders 83. When the required or predetermined amount of fluid under high pressure is obtained in storage chamber B, the pump by-passes excess fluid to the interior of the unit 20, past the valves 109 and 104, through alined recesses 107 and 108, as shown in Figs. 5, 7 and 8.

The drawings herein illustrate one embodiment of the invention but it is to be understood that they are for illustrative purposes only and various changes in the form and proportions of the construction illustrated may be made within the scope of the appended claims without departing from the spirit of the invention.

What is claimed is:

1. In a hydraulic brake, a storage compartment for liquid, storage means in the compartment holding a supply of liquid under high pressure, a wheel brake system, a cylinder in the storage compartment, means for forcing liquid from the cylinder to said wheel brake system and means for subsequently releasing stored liquid to said wheel brake system comprising a valve, a brake pedal and a leverage system operable by the brake pedal to actuate said valve after the liquid forcing means has operated.

2. In a hydraulic brake including a wheel brake system having brake shoes, fluid motors for operating the brake shoes, a liquid chamber, and conduits between said chamber and fluid motors, the combination with a cylinder, of a piston therein having a valve in the piston head, another valve between the cylinder and the chamber, and a brake pedal mechanically connected with the piston valve so that operation of the pedal first closes the valve and then moves the piston.

3. In a hydraulic brake, a wheel brake system, a low pressure actuator therefor comprising a cylinder, a piston therein, a valve stem provided with spaced collars and having a valve seatable in the piston head, a rock shaft having connections with the valve stem, a bell crank lever, said connections comprising a lever having one end yoked between said collars and having its other end connected to said bell crank lever, a spring holding the bell crank lever, an arm on the rock shaft pivotally connected to the first said lever intermediate its ends, a spring pressed release valve, and an arm on the bell crank lever controlling the pressure on the spring of said release valve.

4. In a hydraulic brake, a wheel brake system, a low pressure actuator therefor comprising a piston, a valve in the head of the piston and a valve stem, a high pressure storage device, a high pressure release valve normally closing the high pressure storage device from the wheel brake system, a brake pedal and mechanical connections between the pedal, the piston valve, and the high pressure release valve.

5. In a hydraulic brake, a wheel brake system, a low pressure actuator therefor comprising a piston, a valve in the head of the piston and a valve stem, a high pressure storage device, a high pressure release valve normally closing the high pressure storage device from the wheel brake system, a brake pedal and mechanical connections between the pedal, the piston valve, and the high pressure release valve comprising a lever having one end held yieldably and the other end operatively connected with the piston valve.

6. In a hydraulic brake, a wheel brake system, a low pressure actuator therefor comprising a piston, a valve in the head of the piston and a valve stem, a high pressure storage device, a high pressure release valve normally closing the high pressure storage device from the wheel brake system, a brake pedal and mechanical connections between the pedal, the piston valve, and the high pressure release valve which upon movement of the pedal close the piston valve and move the piston in direction of compression and upon subsequent pedal movement influence the opening of the high pressure relief valve.

7. In a hydraulic brake, a power unit comprising a housing serving as a liquid reservoir, a base having a high pressure chamber, a wheel brake system chamber and a valve closed passage therebetween, a body in the housing mounted on said base, said body comprising a pump cylinder, a storage cylinder and a low pressure actuator cylinder; and means for opening the valve in said passage to allow liquid from said storage cylinder to pass into the wheel brake system chamber.

8. In a hydraulic brake, a power unit comprising a base and associated housing serving as a liquid reservoir, a body on the base having a pump including pump cylinders, storage cylinder and a cylinder for a pedal operated piston, pistons in all the cylinders, engine driven means for actuating the pump, a spring behind the piston in the storage cylinder and mechanical connections for operating the piston in the other cylinder.

9. In a hydraulic brake, a power unit comprising a base having a high pressure chamber, a wheel brake system chamber and a plurality of oil passages between the chambers and the top and bottom of the base, a body on said base having open lower end cylinders registering with some of said passages and also having a passage establishing communication between the two chambers of the base, a valve in the last said passage, and means comprising a rock shaft for opening said valve.

10. In a hydraulic brake, a wheel brake system, a storage compartment holding liquid under high pressure at all times, a low pressure actuator for primarily setting the brake parts in contact, a tube having a pair of opposed spring pressed valves normally segregating the storage compartment from the wheel brake system, a member between the springs of the valves, and means for actuating said member to relieve the compression of one valve spring to connect said storage compartment and wheel brake system and proportionately increase the compression of the other valve spring.

11. A mechanically controlled hydraulic system for brakes including a high pressure builder and storage compartment, means holding liquid under low pressure, a device for forcing liquid mechanically from the liquid holding means to the brake parts to initially set the brakes, and means for subsequently releasing liquid under high pressure from the storage compartment to the brake parts to apply braking force.

12. A mechanically controlled hydraulic system for brakes including a brake pedal, a unit housing having shaft connections to the pedal and to an engine-driven part, a hydraulic power unit in said housing comprising a pump, a cylinder having a spring pressed piston and another cylinder having a mechanically actuated piston with a valve in the head thereof, a release valve for fluid from the cylinder of the spring pressed piston, and mechanical connections from the pedal shaft to the valved piston and to the release valve, so organized as to first cause movement of the valved piston and subsequently effect an opening of the said release valve.

13. In a hydraulic brake, a high pressure builder and storage compartment for liquid, a low pressure actuator comprising a piston, a release valve, a brake pedal, and connections from said pedal comprising a rock shaft, an arm thereon, a lever having one end connected with the piston and its opposite end provided with a spring held part, said lever being pivoted intermediate its ends to said arm, a spring holding the lever for pivoting on said opposite end as it actuates the piston but yieldable upon the development of a predetermined resistance to the piston, and other connections operative when the spring yields to allow discharge of liquid from the storage compartment through the release valve.

14. In a hydraulic brake, a valved piston, a high pressure release valve, a pedal, and connections from the pedal to the piston and to the release valve comprising a bell crank lever having an arm acting on the release valve, a spring holding the bell crank lever in position, a link connecting the bell crank lever to a second lever which actuates the piston, a rock shaft for the pedal, and an arm on the rock shaft pivoted to the second lever intermediate its ends, said spring holding the link as a fulcrum until the development of a predetermined resistance to the movement of the second lever.

15. In a hydraulic brake, a low pressure actuator comprising a cylinder, a piston therein, a valve in the piston head, a valve stem, a brake pedal, mechanical connections between the pedal and the valve stem having provision for first closing the valve then moving the piston in compression direction, a flexible hose connected to the valve stem and a wheel brake system of conduits in communication with the hose whereby the system may be relieved of liquid through the hose and valve.

16. In a hydraulic brake, brake shoes and drums, a storage cylinder for liquid, means adapted automatically to build up and maintain a predetermined high pressure in said storage cylinder, low pressure means including liquid holding means and mechanically operable liquid forcing means adapted to first set the brake shoes in contact with their respective drums, and means in part dependent on the operation of the liquid forcing means for applying high pressure from the storage cylinder in addition to the low pressure means.

17. In a hydraulic brake, brake shoes, a high pressure system for liquid including a storage chamber at all times holding liquid under high pressure, a low pressure liquid actuator, fluid receiving means common to said high pressure system and low pressure actuator, conduits leading from said fluid receiving means to the brake shoes, a valve normally isolating the high pressure system from the fluid receiving means, and lever operated means operative to effect, sequentially, actuation of the low pressure actuator and an opening of the valve whereby to respectively set the brake shoes and apply braking force thereto.

18. In a hydraulic brake, a liquid holding unit having a storage compartment therein, means for maintaining liquid under high pressure in said compartment, wheel brake mechanism including brake shoes, means in said unit holding liquid, and lever actuated means for effecting, sequentially, a forcing of liquid from the liquid holding means to the brake mechanism to set the brake shoes, and then release of stored liquid to the brake mechanism to cause said shoes to exert braking pressure.

19. In a hydraulic brake, a liquid holding unit having a storage compartment holding liquid under pressure, wheel brake mechanism including brake shoes, means in said unit normally in free and open communication with the interior thereof to receive liquid therefrom and to hold it under substantially no pressure, and means operative to effect, sequentially, passage of liquid from the liquid holding means to the brake mechanism to set the brake shoes, and then a release of stored liquid to the brake mechanism.

20. In a hydraulic brake, a liquid holding unit having a storage compartment for liquid therein, means for maintaining a constant supply of liquid under pressure in said compartment, a wheel brake system, mechanically operable means for forcing liquid from said unit to said brake system at a pressure less than that in the storage compartment to initially set the brakes, and means for subsequently releasing stored liquid to said system in additon to the liquid previously forced thereto whereby to apply braking force to the brakes.

21. In a hydraulic brake, a wheel brake system, means including a cylinder and a piston operable therein for forcing liquid to said system at a pressure substantially sufficient to initially set the brakes, a storage compartment holding a supply of fluid at a pressure greater than the first-named pressure, means for releasing the stored liquid to the wheel brake system subsequent to initial setting of the brakes, and lever means having connection with the liquid forcing means and liquid releasing means and so formed and arranged as to actuate said forcing and releasing means sequentially.

22. In a hydraulic brake, a liquid holding unit, a storage compartment therein, pump means for maintaining a substantially constant supply of liquid under pressure in said storage compartment, a wheel brake system, liquid holding means in said unit, and mechanically operable means operative to first force liquid from the liquid holding means to the wheel brake system to initially set the brakes and then to release stored liquid to the wheel brake system to apply braking force.

23. In a hydraulic brake, a high pressure fluid system including storage means at all times holding fluid under high pressure, a low pressure fluid holding actuator, a wheel brake system to which said high pressure fluid system and low pressure actuator are connected, and lever operated means including a valve normally separating the two systems for causing, sequentially, operation of the low pressure actuator to set the brakes and operation of the high pressure system to apply braking force to the set brakes.

24. In a hydraulic brake, a high pressure fluid system including a storage chamber at all times holding liquid under high pressure, a low pressure fluid actuator, a wheel brake system to which said high pressure fluid system and low pressure actuator are connected, a valve normally separating the two systems, a brake pedal, and lever operated means connected to and operated by the brake pedal for causing, sequentially, operation of the actuator to set the brakes and operation of said valve to connect the high pressure system and wheel brake system.

25. The combination with a motor vehicle of a brake system therefor comprising a wheel brake system including brake shoes, a fluid holding unit having a cylinder provided with a resiliently mounted piston for holding fluid therein under pressure, means for forcing fluid from the unit to the wheel brake system to set the brake shoes, lever mechanism for actuating the fluid forcing means, a pump for maintaining a supply of fluid under pressure in the said cylinder, and means including a valve controlled by movement of the lever mechanism for delivering fluid from the cylinder to the wheel brake system.

26. The combination with a motor vehicle of a brake system therefor comprising a wheel brake system including brake shoes, a fluid holding unit having a cylinder provided with a resiliently mounted piston for holding fluid therein under pressure, means for forcing fluid from the unit to the wheel brake system to set the brake shoes, lever mechanism for actuating the fluid forcing means, a pump for maintaining a supply of fluid under pressure in the said cylinder, and means including a valve controlled by movement of the lever mechanism subsequent to operation of the fluid forcing means for delivering fluid from the cylinder to the wheel brake system.

27. In a hydraulic brake, a high pressure fluid system comprising a storage cylinder for liquid having a spring pressed piston therein, a wheel brake system, valve means normally separating said systems, a low pressure actuator comprising a cylinder having a valved piston therein, and means for operating said low pressure actuator so formed and arranged as to subsequently actuate said valve means to connect said high pressure fluid system and wheel brake system.

28. In a hydraulic brake, a brake pedal, brake shoes, a hydraulic system including piping, a supply of liquid under high pressure, a low pressure fluid holding actuator, means including a lost motion lever arrangement controlled by the brake pedal for operating the low pressure actuator to initially set the brake shoes, said means being so formed as to open the piping to the action of the liquid under high pressure subsequent to initial setting of the brake shoes whereby to apply braking force to said shoes.

29. In a hydraulic brake, a wheel brake system including brake shoes, a liquid holding compartment, a storage means in said compartment holding liquid under high pressure at all times, a low pressure actuator for initially setting the brake shoes, a pair of opposed release valves normally segregating the wheel brake system from the liquid under high pressure and means for opening one of said valves to connect the wheel brake system and storage means, the means for opening said valve being so formed as to increase the closing force on the opposite valve.

30. In a hydraulic brake, a high pressure fluid system comprising a storage cylinder for liquid having a spring pressed piston therein, a wheel brake system, valve means normally separating said systems, a low pressure actuator adapted to conduct fluid under pressure to the wheel brake system, and means for operating said low pressure actuator so formed and arranged as to subsequently actuate said valve means to connect said high pressure fluid system and wheel brake system.

31. In a hydraulic brake, a pedal, a hydraulic system comprising high pressure and low pressure devices, said high pressure device including a storage chamber holding a supply of fluid at all times under high pressure, separate and independently functioning release valves for the said devices and connections from the pedal to said devices so formed that primary movement of said pedal actuates the low pressure device to force fluid therefrom and continued movement of said pedal operates the release valve of said high pressure device.

32. In a hydraulic brake, a storage compartment for liquid, means within the compartment adapted to maintain a supply of liquid under pressure therein, liquid holding means in the compartment, a wheel brake system, mechanically operable means for forcing liquid from the liquid holding means to the wheel brake system at a pressure sufficient to effect setting of the brakes, and means for subsequently releasing liquid under pressure from said supply to said wheel brake system to apply braking force to the brakes.

33. In a hydraulic brake, a storage compartment for liquid having means therein holding a supply of liquid under high pressure, a wheel brake system, valve means normally isolating the supply of liquid under high pressure from the wheel brake system, mechanically operable means including a piston for forcing liquid from the compartment to the wheel brake system at a pressure sufficient only to set the brakes, and means for operating the liquid forcing means, said operating means being connected with said valve means in such a manner as to operate said valve means subsequent to setting of the brakes whereby to release liquid under high pressure to the wheel brake system to apply braking force to the brakes.

34. In a hydraulic brake, a storage compartment for liquid, means within the compartment adapted to maintain and hold at all times a supply of liquid under high pressure, a wheel brake system, means in said compartment holding liquid under substantially no pressure, means including a piston operable in said liquid holding means for forcing liquid therefrom to the wheel brake system at a pressure below that of the high pressure liquid but sufficient to effect setting of the brakes, and means for subsequently releasing liquid from said supply to said wheel brake system to apply braking force to the brakes.

35. In a hydraulic brake including a wheel brake system having brake shoes, fluid motors for operating the brake shoes, a storage compartment for liquid, and conduits between said compartment and fluid motors, the combination of a cylinder in said storage compartment, a piston slidable in the cylinder and having a valve in the piston head, a valve stem extending through the piston and projecting beyond the cylinder, means in the compartment holding liquid under high pressure, a valve adapted to control the passage of liquid under high pressure from the liquid holding means to said conduits, and a brake pedal having connections to the projected end of the stem of the piston valve and the valve controlling passage of liquid under high pressure from the liquid holding means, said connections being so formed that initial movement thereof causes closing of the piston valve and movement of the piston in the compressing direction to force liquid from the storage compartment to the conduits to effect setting of the brakes and continued movement thereof an opening of the valve controlling the passage of liquid under high pressure from the liquid holding means and upon reverse operation of said connections to close said last named valve and open the piston valve and move the piston in the reverse direction.

36. A mechanically controlled hydraulic system for brakes including a high pressure builder and storage compartment for liquid, a device for holding liquid and having provision for forcing liquid therefrom under low pressure mechanically to the brake parts to initially set the brakes, lever means for operating said device, and means operated by and in response to actuation of said lever means for releasing liquid under high pressure from the storage compartment to the brake parts subsequent to setting of the brakes whereby to apply braking force.

37. In a hydraulic brake, a storage compartment holding a supply of liquid, storage means in said compartment holding a supply of liquid under high pressure, a wheel brake system, means in the compartment holding a supply of liquid under substantially no pressure, means for forcing liquid from said last named liquid holding means to the wheel brake system, and means for subsequently releasing liquid under high pressure from the storage means to the wheel brake system comprising a valve, a brake pedal, and a lever system operable by the brake pedal to actuate the liquid forcing means and said valve in sequence.

38. A mechanically controlled hydraulic system for brakes comprising a liquid holding unit, a high pressure builder and storage means in said unit, means in said unit holding liquid under substantially no pressure, means for forcing liquid under low pressure from said holding means to the brake parts to set the brakes, and means for subsequently releasing liquid under high pressure from the storage compartment to the brake parts to apply braking force.

39. A mechanically controlled hydraulic system for brakes comprising a liquid holding unit, a high pressure builder and storage means in said unit, means in said unit holding liquid under the same pressure as that in said unit, means for forcing liquid under low pressure from said holding means to the brake parts to set the brakes, and means dependent upon the operation of said forcing means for subsequently releasing liquid under high pressure from the storage compartment to the brake parts to apply braking force.

40. In a hydraulic brake, a liquid holding unit, a pair of cylinders in said unit, continuously operating pump means for maintaining a constant supply of liquid under high pressure in one of said cylinders, the other of said cylinders being so formed as to receive and hold liquid under the same pressure as that in said unit, and means comprising a brake pedal, a piston in said other cylinder and mechanical connections between the pedal and piston having provision for first forcing liquid under low pressure to the brake parts and subsequently releasing liquid under high pressure to the brake parts.

41. In a hydraulic brake, a liquid holding unit having means for storing liquid under high pressure, a wheel brake system, means in said unit holding liquid, means for forcing liquid from the liquid holding means to the wheel brake system to initially set the brakes, and means for subsequently releasing stored liquid to said wheel brake system to apply braking force to the brakes, said forcing means comprising a brake pedal, a piston, and mechanical connections between the pedal and the piston, and said releasing means comprising a valve and mechanical connections involving some of the mechanical connections of the said forcing means.

42. In a hydraulic brake, a wheel brake system, a low pressure fluid system including holding means for fluid and mechanically operated means for forcing fluid from the holding means at a pressure sufficient to initially set the brakes, a high pressure system including a storage compartment holding fluid under high pressure, and means operative to effect release of stored fluid under high pressure to the brake system subsequent to setting of the brakes and in addition to the fluid from the low pressure system.

WILLIS G. DOYLE.